United States Patent Office

> 3,206,506
> Patented Sept. 14, 1965

3,206,506
SEPARATION OF ACETYLGLUTAMINE
Harold W. Griffith, Campbell, Calif., assignor to International Minerals & Chemical Corporation, a corporation of New York
No Drawing. Filed Oct. 26, 1962, Ser. No. 233,452
15 Claims. (Cl. 260—527)

The present invention generally relates to a process for separating acetylglutamine from a mixture containing acetylglutamine and glutamic acid. In a specific aspect, it relates to a process for separating acetylglutamine from a fermentation liquor produced in a biological process for the production of glutamic acid.

L-glutamic acid is widely used in the form of monosodium L-glutamate as a flavor-intensifying agent for a variety of foods. The material in the past was largely obtained from natural sources, e.g., proteins and sugar beet waste liquors. The synthesis of glutamic acid has also been achieved by chemical means in a surprising variety of ways, but in every case the end product is a racemic acid, DL-glutamic acid, which for most purposes must be separated into the optically active isomers. Because of this problem, the chemical synthesis has not as yet been brought to full commercial scale utilization. Where L-glutamic acid alone is desired, as is usually the case in the preparation of food additives, a far more promising approach lies in the use of micro-organisms to convert various substrates by enzymatic means. Here, again, numerous approaches have been tried, utilizing a number of substrates and a variety of organisms.

It has now been determined that fermentation liquor produced in a biological process for the preparation of L-glutamic acid may also contain N$\gamma$-acetyl-L-glutamine values, usually denominated acetylglutamine. Acetylglutamine is a valuable material which finds use in biochemical investigations, culture, media, nutritional studies, and pharmaceutical preparations.

Accordingly, it is an object of the present invention to provide a process for separating acetylglutamine from a mixture containing acetylglutamine and glutamic acid.

It is a specific object of the invention to provide a process for separating acetylglutamine from a fermentation liquor produced in a biological process for the preparation of glutamic acid, which fermentation liquor contains acetylglutamine and glutamic acid.

These and other objects and advantages of the present invention will be apparent from the following description.

Generally described, the present invention is a process for separating acetylglutamine from a mixture containing acetylglutamine and glutamic acid which comprises establishing an aqueous mixture of acetylglutamine and glutamic acid having a pH below about 2.3 and separating solid acetylglutamine from the liquid phase.

In a specific embodiment, the present invention is a process for separating acetylglutamine from a fermentation liquor containing acetylglutamine and glutamic acid which comprises acidifying the fermentation liquor to a pH below about 2.3 whereby solid acetylglutamine is precipitated and the glutamic acid remains in solution, and separating said solid acetylglutamine from the liquid phase.

In another specific embodiment, the present invention contemplates a process for separating acetylglutamine from a mixture containing solid acetylglutamine and solid glutamic acid which comprises mixing said solids mixture with water and a strong non-oxidizing acid to establish in the resultant mixture a pH below about 2.3 whereby said glutamic acid is dissolved and said acetylglutamine remains as a solid, and separating the solid acetylglutamine from the resultant solution.

Fermentation procedures for the production of broths containing glutamic acid have been reported extensively in the literature. Such references include, inter alia, Canadian Patent 604,712 (*Micrococcus glutamicus*); Canadian Patent 625,387 (*Brevibacterium divaricatum*); Canadian Patent 633,170 (*Microbacterium flavum*); Belgian Patent 609,701 (*Corynebacterium lilium*); U.S. Patent 3,032,474 (*Bacillus mageterium-cereus*), and the like.

Such fermentations employ an appropriate microorganism in an aqueous medium containing a carbohydrate such as sugar, starch, or the like and a nitrogen source such as ammonia, urea, and the like. The fermentations are aerobic and are carried out at a pH between about 5 and about 9. The final fermentation broths will contain bacteria cells, colloidal by-product impurities, and at times, impurities introduced with the starting materials. Such fermentation broths, particularly those employing *Corynebacterium lilium* or *Corynebacterium callunae*, have been found to contain acetylglutamine as well as glutamic acid.

The final fermentation broth may first be treated utilizing any of the wide variety of known expedients to remove the cells present. Generally, it has been found that centrifuging provides rapid and efficient removal of the cells present in the broth.

Following removal of the cells from the broth, the broth may be treated in a variety of ways to remove colloidal impurities. One such means includes the addition of a filter aid and filtration using standard equipment such as frame or rotary filters. Other methods for removal of the colloidal impurities are reported in the art and are within the skill of the routineer.

When the purified concentrated fermentation liquor is processed by standard procedures, e.g., the liquor is adjusted to a pH within the range of from about 2.5 to about 4.0 and preferably to about 3.2 (the isoelectric point of glutamic acid at ambient temperatures), both L-glutamic acid and acetylglutamine crystallize therefrom. The recovery of glutamic acid from fermentation liquors containing both acetylglutamine and glutamic acid, therefore, presents a special problem since when conventional methods are used, the purity of the recovered glutamic acid is reduced by the presence of acetylglutamine. This special problem is solved by the process of this invention, since, as hereinbefore set forth, it has been discovered that acetylglutamine may be separated from a mixture containing acetylglutamine and glutamic acid when the mixture is established in an aqueous mixture having a pH below about 2.3, preferably below about 2.0, and still more preferably at a pH of about 1.0. At a pH of below about 2.3, it has been determined that the acetylglutamine exists in the solid phase while the glutamic acid forms the soluble acid salt of glutamic acid and remains in solution.

When the concentrated fermentation liquor has the pH adjusted to within the range of from about 2.5 to about 4 and preferably to about 3.2, solid acetylglutamine and glutamic acid crystals precipitate from the solution. In accordance with the present invention, this solids mixture of acetylglutamine and glutamic acid is separated from the mother liquor and the solids mixture is then repulped in an aqueous medium and a pH of below about 2.3 is established. Preferably, the pH is below about 2.0 and still more preferably the pH is about 1.0. At these pH's the glutamic acid exits as the soluble acid salt of glutamic acid and the acetylglutamine remains as a solid. The solid acetylglutamine is then separated from the acid salt of glutamic acid solution.

The solids mixture of acetylglutamine and glutamic acid may be mixed with water and the resultant mixtures subsequenty acidified or the solids mixture may be mixed directly with an aqueous acid solution. In any event, an acid solution is established having a pH below about 2.3. The process may also be effected by extraction with an acid solution having a pH below about 2.3 whereby the glutamic acid is dissolved, leaving solid acetylglutamine.

The amount of water provided for the solution is at least sufficient to dissolve substantially all of the acid salt of glutamic acid at the pH established. Acetylglutamine, while relatively insoluble in aqueous solution at pH's below about 2.3, does have a relatively small solubility and, therefore, the amount of water provided is preferably not greatly in excess of that necessary to dissolve the acid salt of glutamic acid. Further, it is preferred that the solution be at a temperature below about 40° C., and more preferably below about 35° C. when the solid acetylglutamine is separated from the aqueous phase. The temperature is, of course, above the freezing point so as to maintain a liquid phase.

In another embodiment of the present invention, the purified concentrated fermentation liquor, which contains acetylglutamine and glutamic acid, is directly acidified to a pH of below about 2.3 and preferably to a pH of about 1.0. When acidified to the indicated pH, acetylglutamine precipitates from the fermentation liquor and the remaining fermentation solution contains the glutamic acid in solution as the acid salt of glutamic acid. The solid acetylglutamine may then be separated from the liquid phase in any suitable manner such as by filtration, centrifugation, etc. In this embodiment of the invention, it is also preferred that the solution be at a temperature below about 40° C. and more preferably below about 35° C. when the solid acetylglutamine is separated from the liquid phase. The temperature is, of course, above the freezing point so as to maintain a liquid phase.

The adjustment or establishment of the pH's indicated may be made with any suitable strong acid. Suitable acids are hydrochloric acid, sulfuric acid, phosphoric acid, chloroacetic acid, etc., with hydrochloric acid being specifically preferred.

It will be apparent that the crystals obtained at any of the various phases of embodiments of this invention may be purified by conventional means. They may be repulped and recrystallized, decolorized, and the like to remove color bodies, etc. Since such purification techniques are well known to those skilled in the art, they will not be described further here.

The terms "glutamic acid" and "acetylglutamine" as employed herein define the compounds themselves as well as their acid salts, alkali metal salts, and the like.

In order to give a fuller understanding of the invention, but with no intention to be limited thereto, the following specific examples are given.

*Example I*

A concentrated fermentation liquor was produced in a process for producing glutamic acid by fermenting a glucose solution with *Corynebacterium lilium* according to the procedure set forth in Belgian Patent 609,701. The fermentation liquor contained acetylglutamine and glutamic acid in solution. To 500 grams of the concentrated fermentation liquor, 150 grams of hydrochloric acid was added to bring the pH to about 3.2. A crystalline precipitate formed and was separated from the solution and washed with water. The precipitate was then dissolved in an aqueous solution of sodium hydroxide at 6.1 pH, filtered, and the filtrate decolorized with activated carbon. The resultant decolorized liquor contained acetyl-glutamine and glutamic acid. The decolorized liquor was then acidified to a pH of 1.8 with hydrochloric acid whereupon acetylglutamine precipitated from the solution and the glutamic acid remained in solution as the water soluble glutamic acid hydrochloride. The acetylglutamine was filtered from the solution at a temperature of about 24° C. and was dried. The dried acetylglutamine weighed 27.7 grams and had a purity of about 95%.

*Example II*

A fermentation liquor was produced in a process for producing glutamic acid by fermenting a glucose solution was *Corynebacterium lilium*, according to the procedure set forth in Belgian Patent 609,701. The liquor was filtered to remove bacterial cells and the filtrate concentrated to about 55% dissolved solids content (dry basis). The concentrated liquor was then acidified with hydrochloric acid to a pH of about 3.2, at which pH a precipitate of acetylglutamine and glutamic acid formed. After crystallizing at room temperature (25° C.), the material was filtered. The filtrate was hydrolyzed to produce more glutamic acid from the glutamic acid precursors. The filter cake is repulped in an acid solution at a pH of 1.0. Sufficient acid solution was used to dissolve the glutamic acid in the cake as glutamic acid hydrochloride. The undissolved solid was a high purity acetylglutamine which was recovered by filtering the mixture at room temperature (25° C.). The filtrate was then adjusted to a pH of about 3.2 with sodium hydroxide whereupon glutamic acid crystals precipitated out of the solution. The glutamic acid crystals were removed by filtration.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. A process for separating acetylglutamine from a mixture containing acetylglutamine and glutamic acid which comprises establishing a mixture of acetylglutamine and glutamic acid in water having a pH below about 2.3 and separating solid acetylglutamine from the liquid phase.

2. The process of claim 1 wherein said pH is below about 2.0.

3. The process of claim 1 wherein said pH is about 1.0.

4. The process of claim 1 wherein said acetylglutamine is separated from the liquid phase when the aqueous mixture is at a temperature below about 40° C.

5. The process of claim 1 wherein said acetylglutamine is separated from the liquid phase when the mixture is at a temperature below about 35° C.

6. A process for separating acetylglutamine from a fermentation liquor containing acetylglutamine and glutamic acid which comprises acidifying said fermentation liquor to a pH below about 2.3 whereby solid acetylglutamine is precipitated and the glutamic acid remains in solution, and separating said solid acetylglutamine from the liquid phase.

7. The process of claim 6 wherein said pH is below about 2.0.

8. The process of claim 6 wherein said pH is about 1.0.

9. The process of claim 6 wherein said acetylglutamine is separated from the liquid phase when the mixture is at a temperature below about 40° C.

10. The process of claim 6 wherein said acetylglutamine is separated from the liquid phase when the mixture is at a temperature below about 35° C.

11. A process for separating acetylglutamine from a mixture containing solid acetylglutamine and solid glutamic acid which comprises mixing said solid mixture with water and a strong non-oxidizing acid to establish in the resultant aqueous mixture a pH below about 2.3 whereby said glutamic acid is dissolved and said acetylglutamine remains as a solid, and separating the solid acetylglutamine from the resultant solution.

12. The process of claim 11 wherein said pH is below about 2.0.

13. The process of claim 11 wherein said pH is about 1.0.

14. The process of claim 11 wherein said acetylglutamine is separated from the liquid phase when the aqueous mixture is at a temperature below about 40° C.

15. The process of claim 11 wherein said acetylglutamine is separated from the liquid phase when the aqueous mixture is at a temperature below about 35° C.

References Cited by the Examiner

UNITED STATES PATENTS 2,706,737  4/55  Cardinal.

OTHER REFERENCES

King: J.A.C.S., vol. 74, pp. 2859–64 (1956).

References Cited by the Applicant

Article, "Application of Compositional Knowledge to Beet Sugar Technology," Journal of Agricultural and Food Chemistry, 3, (4), pp. 350–353.

LORRAINE A. WEINBERGER, *Primary Examiner*.
LEON ZITVER, *Examiner*.